United States Patent [19]
Spani

[11] Patent Number: 4,897,591
[45] Date of Patent: Jan. 30, 1990

[54] REGULATED BATTERY CHARGER

[75] Inventor: Wayne M. Spani, San Diego, Calif.

[73] Assignee: Fisher Scientific Group Inc., San Diego, Calif.

[21] Appl. No.: 47,413

[22] Filed: May 6, 1987

[51] Int. Cl.$^4$ ................................................ H02J 7/04
[52] U.S. Cl. .......................................... 320/32; 320/39
[58] Field of Search ....................... 320/20, 21, 22–24, 320/31, 32, 39, 40; 323/319

[56] References Cited

U.S. PATENT DOCUMENTS

| | | | |
|---|---|---|---|
| 3,382,425 | 5/1968 | Legatti ................................... | 320/32 |
| 3,925,714 | 12/1975 | Sherman, Jr. ..................... | 320/32 X |
| 4,131,841 | 12/1978 | Bennefeld ........................... | 320/32 X |
| 4,476,425 | 10/1984 | Chernotsky et al. ................. | 320/39 |
| 4,629,965 | 12/1986 | Fallon et al. ....................... | 320/32 X |

OTHER PUBLICATIONS

"Sensitive Gates SCRS—Don't forget the Gate-Cathode Resistor" by T. Malarky in Engineering Bulletin.
"Charger Circuits" by Barcus et al. in Gates Battery Charger Application Manual, 1982.
"Guide to Thyristor Applications" in Motorola Semiconductor Products, Inc., 1982.
"SCR and Triac Power Control Fundamentals" in Motorola Semiconductor Products Inc., 1978.
"Charging" in Yuasa Battery Co., Ltd. Application Manual, 1986.
"General Characteristics" in Panasonic Sealed Lead-Acid Batteries Technical Handbook, 1985.
"Battery Charging Regulator" by Connolly et al. in General Electric SCR Manual Sixth Edition, 1979.

Primary Examiner—R. J. Hickey
Attorney, Agent, or Firm—Nydegger & Harshman

[57] ABSTRACT

The present invention is an electrical circuit for regulating the average current through and the voltage across a load, such as a rechargeable battery. The circuit includes at least one semiconductor switching device connected in series with the load for controlling the current through the load. A current control loop is provided in the circuit to maintain the average current through the load at a constant level despite changes in the resistance of the load. Also provided is a voltage control loop which acts to limit the voltage across the load to a value below a predetermined voltage level.

23 Claims, 3 Drawing Sheets

REGULATED BATTERY CHARGER

BACKGROUND

1. The Field of the Invention

The field of the present invention generally relates to regulated electrical power supplies. More specifically, the present invention relates to electrical circuits for providing constant current regulation as well as overvoltage limitation and which are particularly well adapted for use as a battery charger.

2. The Background Art

Nearly all modern electronic devices require what is generally termed a "power supply" in order to conveniently operate the device from available sources of electricity. The most common of these is the AC power line. It is the function of a power supply to convert the alternating current found on the power line, which is often at potentials which range between 100 and 240 volts rms, to a rectified voltage generally in the range from 6 to 24 volts. Thus, the functions of a power supply are the transformation of the high power line voltages to a lower voltage and rectification of the current flow. It is often the case that a conventional power supply is used to charge what are referred to as a secondary cell, i.e., a rechargeable battery.

Generally, a power supply contains a transformer and a rectifier circuit. Additionally, a capacitor, as well as other components, may also be used in order to provide filtering to reduce the ripple present in the output voltage. While such a simple power supply may properly power some electronic circuits and devices, for optimum performance it is often necessary that the power supply be regulated. This is also true for secondary electrochemical cells.

The term "regulated" refers to the characteristic of a power supply whereby under varying load conditions (e.g., varying resistance) either the voltage or the current through the load will remain constant. Voltage regulation or current regulation is provided by an electrical circuit which is incorporated into the power supply in addition to the transformer, rectifiers, and any additional filtering components. It is nearly always the case that any electrical circuit acting as a load will perform more reliably and consistently if power is provided to it by a regulated power supply. The use of regulated power supplies also allows maximum performance from secondary electrochemical cells, groups of which are referred to as batteries. Since a battery charger is merely a specialized form of a power supply, the two terms will be used interchangeably throughout this disclosure.

The term "secondary cell" generally refers to an electrochemical cell which produces a voltage across its terminals and is capable of being recharged to its original state after being discharged. The operation of a secondary cell is in contrast to that of a primary cell, which must be discarded after it becomes discharged. It is uncommon, however, to use a single secondary cell. Rather, a plurality of secondary cells are connected in series to form a battery. For convenience, rather than referring to a secondary cell, the terms "rechargeable battery" or just "battery" will be used herein. Use of the term "battery" is intended to encompass both single secondary cells and rechargeable batteries.

Regulated power supplies and regulated battery chargers may be designed to have several different attributes. The most common of these are constant voltage and constant current. The constant voltage regulated power supply is designed to provide a constant voltage, regardless of the amount of current that is drawn or "sinked," by the load, which in the case of a charger is a battery. Alternatively, a constant current regulated power supply is designed to provide a constant current regardless of the voltage required in order to maintain the constant current flow. It will be appreciated that the actual performance of regulated power supplies are far from the ideal.

For example, it is often impractical to design and construct a constant voltage power supply which is capable of delivering "unlimited" current. Similarly, it is impractical, as well as impossible in some cases, to design and construct a constant current regulated power supply which will maintain a constant current through any load. Furthermore, some power supplies are designed to operate as a constant current supplies under some conditions and constant voltage supplies under others.

It is the application that substantially determines the type of regulation desired. A transistorized amplifier generally requires a constant voltage in order to operate properly. Alternatively, the charging of batteries is best carried out with a constant current. Rechargeable batteries are finding expanded applications in many industrial, scientific, medical, and consumer situations. Thus, providing efficient chargers is becoming more important as more applications for rechargeable batteries are found.

One of the most common examples of a rechargeable battery is the lead-acid battery used to power the starter in nearly all automobiles. A particular variant of this class of batteries is the so-called "gel-cell" battery in which the electrolyte is a highly viscous gel and the case is sealed. Since the lead-acid battery is impractical in many circumstances, other types of rechargeable batteries have been developed, including what are commonly referred to as nickel cadmium batteries. Modern nickel cadmium batteries have a useful lifetime extending through hundreds, or even thousands, of charge-and-discharge cycles. The popularity of nickel cadmium, or Ni-Cad, batteries is increasing, as they find more and more applications in many different fields.

As stated earlier, a constant current power supply is most useful for recharging batteries. This will be appreciated by understanding that the rechargeable battery is an electrochemical device. The rate of electrochemical reaction, assuming constant temperature, s generally current dependent. Thus, the material liberated in discharging an electrochemical cell (e.g., rechargeable battery) is directly proportional to the quantity of current circulated through the cell. In other words, for each ampere of current supplied by the cell during the discharge process, a calculable mass of material is liberated. This electrochemical reaction is reversed during the recharging process. For each ampere of current circulated through a cell in an ideal rechargeable battery, a certain mass of material will be deposited, until all of the material liberated during the discharge process has been recombined and the rechargeable battery is fully charged.

Importantly, the voltage found across the terminals of a battery is not an accurate indication of the state of charge of the battery. Interestingly, one of the desirable properties of "gel-cell" as well as Ni-Cad batteries is that the terminal voltage remains constant until the capacity of the battery is nearly exhausted. The same is true during the recharging process. The terminal voltage rapidly rises to a nominal voltage even through the battery may have only been recharged to ten percent of capacity.

Thus, monitoring the voltage found at the battery terminals is not an accurate indication of the state of charge of the battery. An excessively high terminal voltage, however, is indicative of an "overcharged" condition. Furthermore, the internal resistance of the battery to the "charging current" will vary greatly during the recharge process, generally being lowest when the battery is completely discharged and highest when the battery has reached its maximum charge.

Thus, if it is desired to recharge a battery within for example, four hours, the application of a constant voltage will not assure that full recharge takes place within the desired time. This is due to the fact that the internal resistance of the cell varies during recharging, and the amount of current passing through the battery will also vary. The application of whatever voltage is necessary to maintain a constant current, will on the other hand allow the battery to be predictably fully recharged within a desired time. Thus, in order to reliably recharge a battery within a desired amount of time, a battery charger should be regulated to provide a constant current.

There exist two principal methods of implementing power supply regulation: dissipative regulation and switching regulation.

In dissipative-type regulators, an electronic device, such as a transistor or vacuum tube, is operated linearly to control the flow of current through it, and thus also the voltage drop across it. Modern power supplies generally use transistors. The transistor may be configured in a series pass arrangement (where all the current flowing to the load passes through the transistor) or a shunt arrangement (where the current is shunted through the transistor rather than being allowed to flow through the load). The linear operation of the transistor allows very accurate regulation since the current or voltage supply to the load may be varied in very small increments.

It is important to note that the dissipative-type regulators inherently operate at low efficiencies. The following example will illustrate the low efficiency of the dissipative-type regulators. Assume that a "series pass" transistor is controlling the current to the load at a constant level. Also assume that a constant current of one ampere is flowing through the series pass transistor and the load and that the voltage drop across the load is 35 volts. If there is a voltage drop of two volts across the series pass transistor, the transistor would be required to dissipate a mere two watts of power and heat.

If on the other hand, the voltage required to maintain a current of one ampere diminishes to 20 volts, in order to maintain the current at a constant one ampere, the series pass transistor would be required to experience a drop of 17 volts. Thus the transistor should be capable of dissipating 17 watts of power and heat. The seriousness of this situation is dramatic where it is known that wide variations in voltage will be experienced while constant current is to be maintained.

In situations where wide voltage swings will be experienced, such as when charging batteries, it is necessary to set the operating point of the series pass transistor at approximately the middle of the expected voltage range. Thus, dissipative-type regulators inherently operate at efficiencies of 50% to a maximum 60% and are particularly inefficient when operating at the extremes of the voltage ranges, depending upon the particular type of circuit used in the regulator.

While the efficiency of electronic circuits is always a concern to the circuit designer and builder, in many applications the power or heat dissipated by a regulator is of greater concern. For example, in the medical arts, it is common to incorporate rechargeable batteries in medical devices, such as infusion pumps. Inclusion of rechargeable batteries in medical devices allows the devices to continue to provide life support functions even when AC power is removed. The use of rechargeable batteries and built-in rechargers allows the battery to be maintained in a fully charged condition and thus to be available for use at any time without the need for constant operator surveillance.

Dissipative-type regulators have a serious drawback in such applications. It is generally desirable to make such medical devices as small as possible. Furthermore, it is also desirable to enclose such devices in sealed housings without any ventilation.

As is well known, increases in component temperature cause dramatic increases in the failure rates of those components. For example, it has been found that for every 10° centigrade rise in temperature, components commonly found in medical devices experience a twofold increase in their failure rates. This effect of heat generated by dissipative-type regulators is an especially serious consequence in medical devices where component failure can be potentially life threatening.

In contrast to the operation of dissipative-type regulators are the switching-type regulators. In switching-type regulators the linearly operating series pass element found in dissipative-type regulators is replaced by a switching device. Such switching devices should have the characteristics of an ideal switch, that is, infinite resistance when turned off and zero resistance when closed, or turned on. Modern transistors provide very good approximations of these ideal characteristics. When used as constant current regulators, the amount of time that the switching device is on constitutes its duty cycle and determines the average current through the load.

Since switching devices, such as transistors, SCRs, triacs, or similar devices, are either on or off, very little power loss is experienced. According to Ohm's law, power generated equals $I^2R$. When the switch is conducting and the resistance is zero; when it is not conducting the current is zero. Thus power dissipation will in theory be zero. While switching-type regulators often require more components than their dissipative-type counterparts, it is still possible to realize considerable savings in volume and weight with them, since much smaller and lighter weight components can be used. In particular, large filter capacitors are not needed.

Thus, the inherently higher efficiency, and lower heat generation, as well as the savings in volume and weight, make switching-type regulators compatible for use in medical device applications, such as described above. Switching-type regulators, however, inherently have other drawbacks.

First, switching-type regulators have much less precise regulation than their dissipative-type counterparts. In order to increase the precision of the regulation, it is necessary to increase the switching rate. Increasing the switching rate, however, leads to a second drawback. As the switching rate is increased to improve regulation precision, switching transients are produced a very high and higher frequencies. Thus, even reasonably precise switching-type regulators can produce an excessive amount of radio frequency interference. Unless deliberate precautions are taken to reduce the radiation of radio frequency interference, severe interference with the operation of surrounding devices can occur.

By an understanding of the foregoing, it will be appreciated that it would be an advance in the art to provide a regulated battery charger which maintains a high efficiency over a widely varying range of voltages. It would also be an advance in the art to provide a battery charger which generates very little heat and thus is suitable for use in enclosures lacking ventilation. Still further, it would be an advance in the art to provide a regulated battery charger with the above attributes which requires relatively few components and which when assembled occupies a very small volume of space.

It would be yet another advance in the art to provide a regulated battery charger which combines the above advantages and which radiates an inconsequential amount of radio frequency interference. Another advance in the art would be to provide a regulated power supply incorporating all of the above listed attributes which exhibits regulation precise enough and current carrying capacities high enough to suit it for use as a battery charger.

These and other advantages provided by the present invention over the devices found in the art will become more fully apparent with an understanding of the present invention gained by an examination of the following description of the preferred embodiment.

BRIEF SUMMARY AND OBJECTS OF THE INVENTION

The present invention is an electrical circuit for regulating the average current through, and the voltage across, a load. The invention has particular use when the load is a rechargeable battery. The circuit of the present invention comprises at least one switching device connected in series with the load. In the preferred embodiment of the present invention, two semiconductor switching devices are used in cooperation with a transformer having a secondary provided with first and second end terminals and a center tap. Each end terminal of the secondary is connected to a first current carrying terminal of each semiconductor switching device, while the center tap is connected to a first terminal of the load.

A current control loop is provided to maintain the current through the load at a constant value. Part of the current control loop is a sensing element interposed between a second terminal of the load and the second current carrying terminals of the semiconductor switching devices. As current flows through the sense element a sensed voltage is generated representative of the current flowing through the load. The remainder of the current control loop averages the sensed voltage, compares it to a first reference voltage, and produces a control signal which controls the duty cycle of the semiconductor switch devices to accurately maintain the average current through the load at a constant level.

The present invention is also provided with a voltage control loop or overvoltage protection circuit. The voltage control loop monitors the voltage across the terminals of the load, compares this voltage to a second reference voltage, and interrupts the current control loop so that the current through the load will decrease or even terminate, if the voltage across the terminals of the load exceeds a predetermined threshold voltage.

It will be appreciated that a primary advantage of the present invention is that it is much more efficient than dissipative-type regulators or chargers, which operate at about a 50% to 60% efficiency. While ordinary switching-type regulators operate at about 70% to 75% efficiency, most generate excessive radiofrequency interference (RFI) which requires the addition of shielding in order to comply with Federal Communications Commission rules. The addition of shielding, or other components to reduce RFI, adds both bulk and weight to the charger or regulator, both of which need to be kept at a minimum in medical devices such as infusion pumps. While the present invention operates at efficiencies of about 66% to 77%, it does not generate significant amounts of RFI and thus does not have the disadvantages normally associated with conventional switching-type regulators.

In view of the foregoing, it is a primary object of the present invention to provide a regulated battery charging circuit which exhibits high efficiency over a wide range of voltages.

Another object of the present invention is to provide a charger or regulator which occupies a minimum amount of space.

Yet another object of the present invention is to provide a power regulation or battery charging circuit which generates little heat and thus is suitable for use in compact and unventilated enclosures.

Still another object of the present invention is to provide a high efficiency, compact regulated battery charging circuit which does not radiate consequential amounts of radio frequency interference.

Yet another object of the present invention is to provide a battery charger circuit which monitors the terminal voltage of the battery and limits the current flowing through the battery in order to prevent overcharging.

Still another object of the present invention is to obtain a battery charger circuit which is compact and efficient, and which provides a constant charge current through a battery.

These and other objects of the present invention will become more fully apparent after consideration of the following description provided herein.

DETAILED DESCRIPTION OF THE PREFERRED EMBODIMENT

Figure 1:
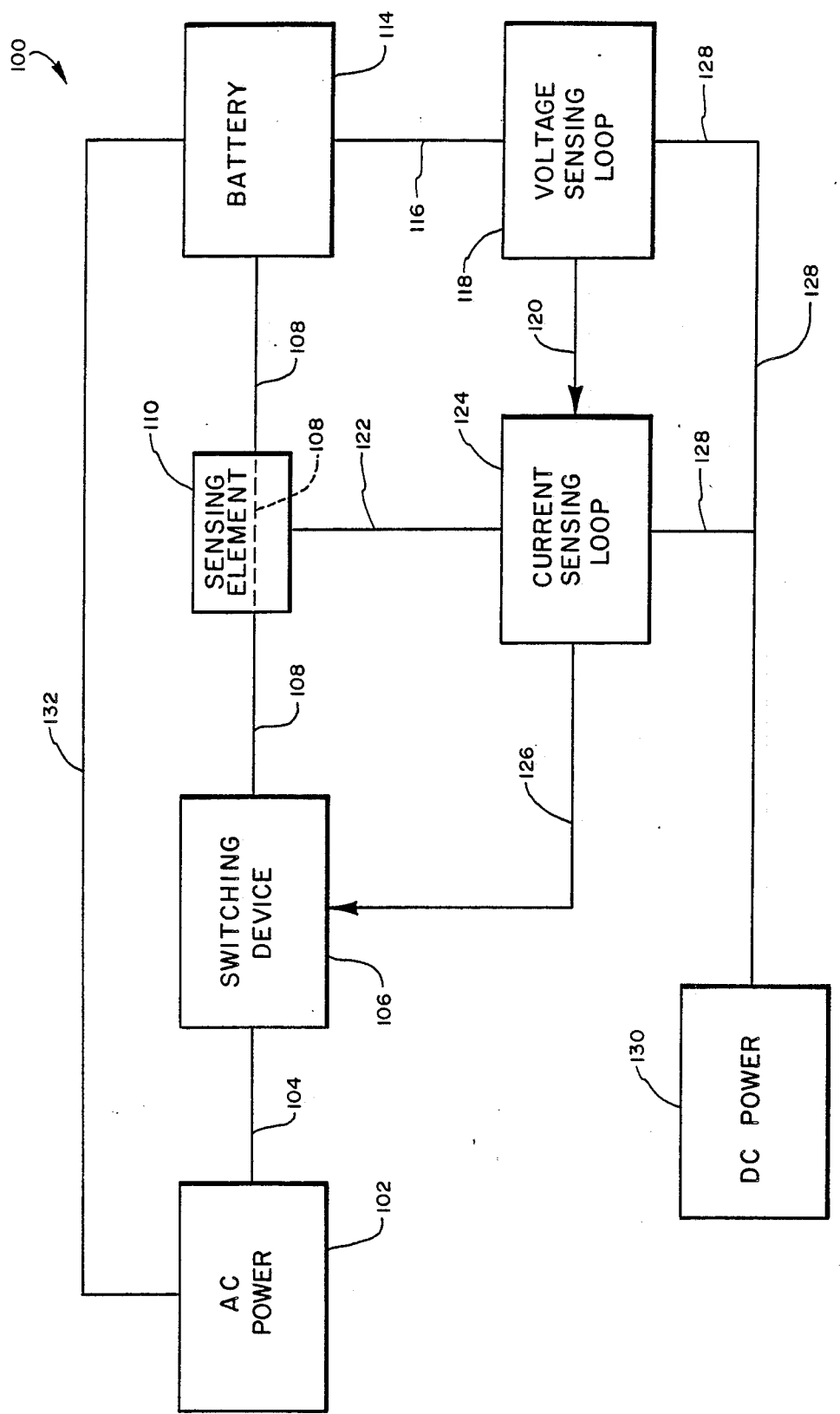
FIG. 1 diagram illustrating the major functional blocks of the present invention.

Reference will now be made to the drawings to explain the structure and operation of a presently preferred embodiment of the invention. Reference will first be made to FIG. 1 for a general overview of the structure and function of the present invention and then to the simplified schematic of a preferred embodiment illustrated in FIG. 2. It should be appreciated that the embodiments depicted in the figures are merely intended to be illustrative. It is specifically contemplated that the present invention may take many different forms and be used in many different applications other than merely those illustrated herein.

1. General Structure and Function of the Present Invention

The major functional blocks of a circuit 100 according to the present invention are illustrated in FIG. 1. Block 102 labeled "AC Power" represents a source of alternating current which is of sufficient current supplying capacity to satisfy the needs of the load. The load in FIG. 1 is represented by block 114 labeled "Battery." It should be appreciated that loads other than battery cells could be used with the present invention, however, the present invention is most particularly adapted for efficient charging of batteries.

Block 106 labeled "Switching Device" represents an electrical device capable of acting as a switch. While it is presently contemplated that a semiconductor switch device will be used, such as a transistor, silicon controlled rectifier (SCR), or triac, it is possible that mechanical or vacuum tube type devices could also be used. Mechanical or tube type devices generally would, however, cause a decrease in performance in most applications.

The two most important features of the Switching Device are first that the device should exhibit characteristics as close as possible to an ideal switch by possessing infinite open-circuit impedance and zero closed-circuit impedance, and second that the device should be able to change states extremely quickly, at least on the order of microseconds. The switching device must also have sufficient current carrying capacity. It will be appreciated that generally only semiconductor switching devices are capable of fulfilling these requirements. Devices may, however, be fabricated in the future which fulfill these requirements and which are more desirable than the semiconductor switching devices mentioned above. These are contemplated as within the scope of the switching devices appropriate for use in the present invention.

As can be seen in FIG. 1, Switching Device 106 is connected in series between AC Power 102 and Battery 114 by lines 104 and 108. Line 132 connected between Battery 114 and AC Power 102 represents the completion of the closed current path from AC Power 102 through Switching Device 106 and Battery 114 back to AC Power 102 Thus it will be appreciated that all the current flowing through Battery 114 also flows through Switching Device 106 and Switching Device 106 is able to control the flow of current through Battery 114.

When used as a battery charger, the present invention is best principally configured as a constant current supply. That is, it is generally desirable to maintain the charge current through Battery 114 at a constant level so that charging can be predictably controlled. The current through line 108 is monitored and expressed as a voltage by block 110 labeled "Sensing Element." Sensing Element 110 should be constructed so as to only minimally affect the current flow through line 108, but still to provide an accurate indication of the current flow. Thus, line 108 is broken as it passes through block 110 to indicate that Sensing Element 110 monitors the current through line 108 but does not substantially affect it.

The voltage expressed by Sensing Element 110 is conveyed to block 124, labeled "Current Sensing Loop." Current Sensing Loop 124 produces a signal, which is represented by arrow 126, to control the duty cycle of Switching Device 106 to maintain the average current through Battery 114 at a constant level.

Since Switching Device 106 is controlling a flow of current from AC Power 102 that is alternating, average current through Battery 114 is controllable by changing the state of Switching Device 106 at various times in the AC power cycle. Thus, if a greater amount of average current is required, the length of time Switching Device 106 is closed will be increased, lengthening the duty cycle thereof. Average current in this context is understood to be the total charge that flows through Battery 114 during a given number of cycles of the AC power cycle averaged over the period of time corresponding to that number of cycles.

It is important that Battery 114 not be overcharged. Thus, the present invention includes an overvoltage protection circuit, represented by block 118 and labeled "Voltage Sensing Loop." Voltage Sensing Loop 118, which is interfaced to Current Sensing Loop 124 by line 120, monitors the terminal voltage of Battery 114. When the terminal voltage of Battery 114 reaches a predetermined threshold voltage, Voltage Sensing Loop 118 interrupts the operation of Current Sensing Loop 124 with a control signal represented by arrow 120. This prevents the voltage across the terminals of Battery 114 from increasing further and permits it to decrease to a safe level.

Block 130 labeled "DC Power" represents a DC power source which supplies the current and voltage required to operate the active components of Voltage Sensing Loop 118 and Current Sensing Loop 124. DC power is connected to Voltage Sensing Loop 118 and Current Sensing Loop 124 by a

2. Description of the Structure of the Preferred Embodiment

Figure 2:
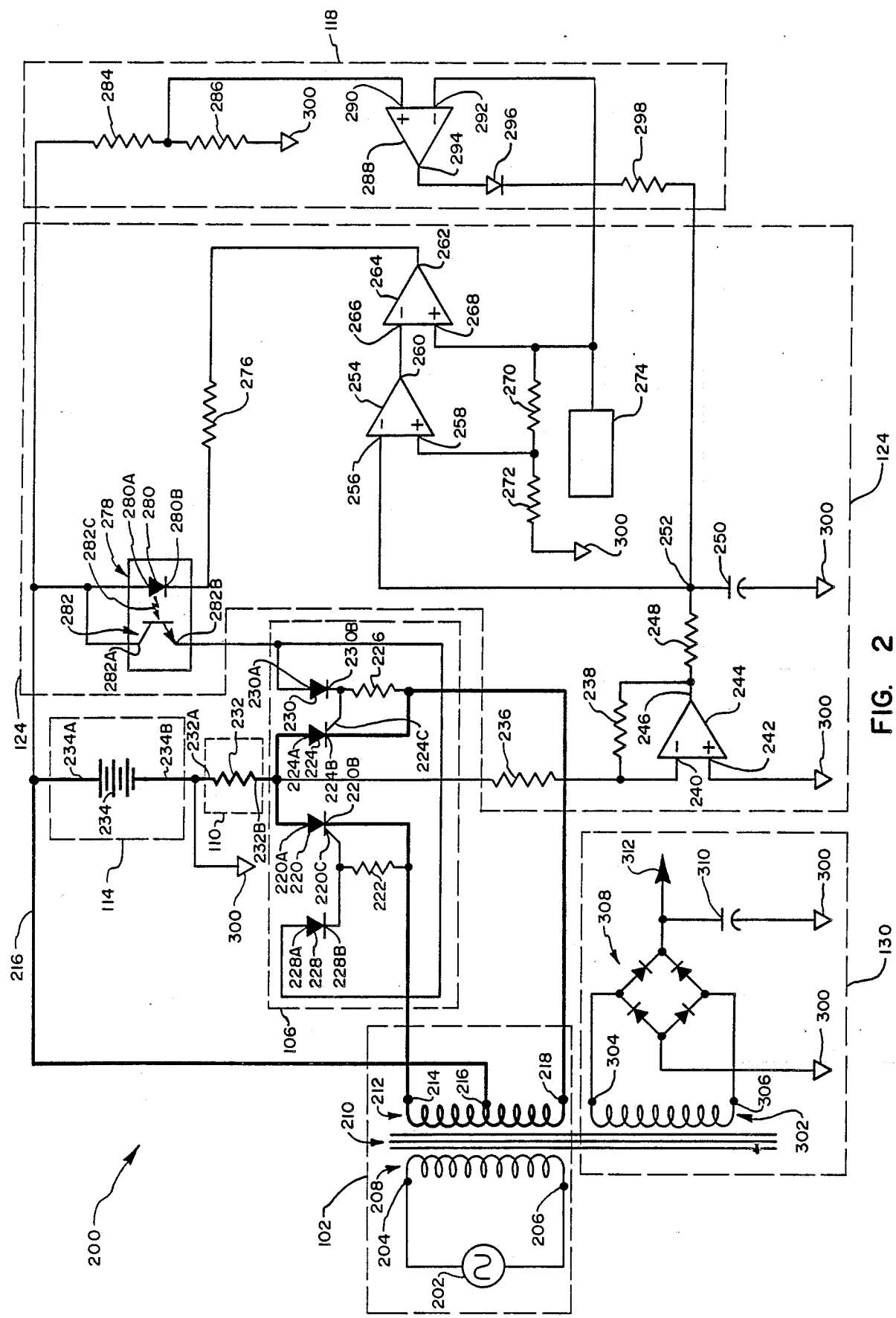
FIG. 2 is schematic diagram showing the major components used in one embodiment of the present invention, wherein the boxes in dashed lines correspond to functional blocks illustrated in FIG. 1 to indicate which components perform each function.

Reference will be now be made to FIG. 2, which is a simplified schematic diagram of one embodiment of a circuit 200 embodying the present invention.

Figure 3:
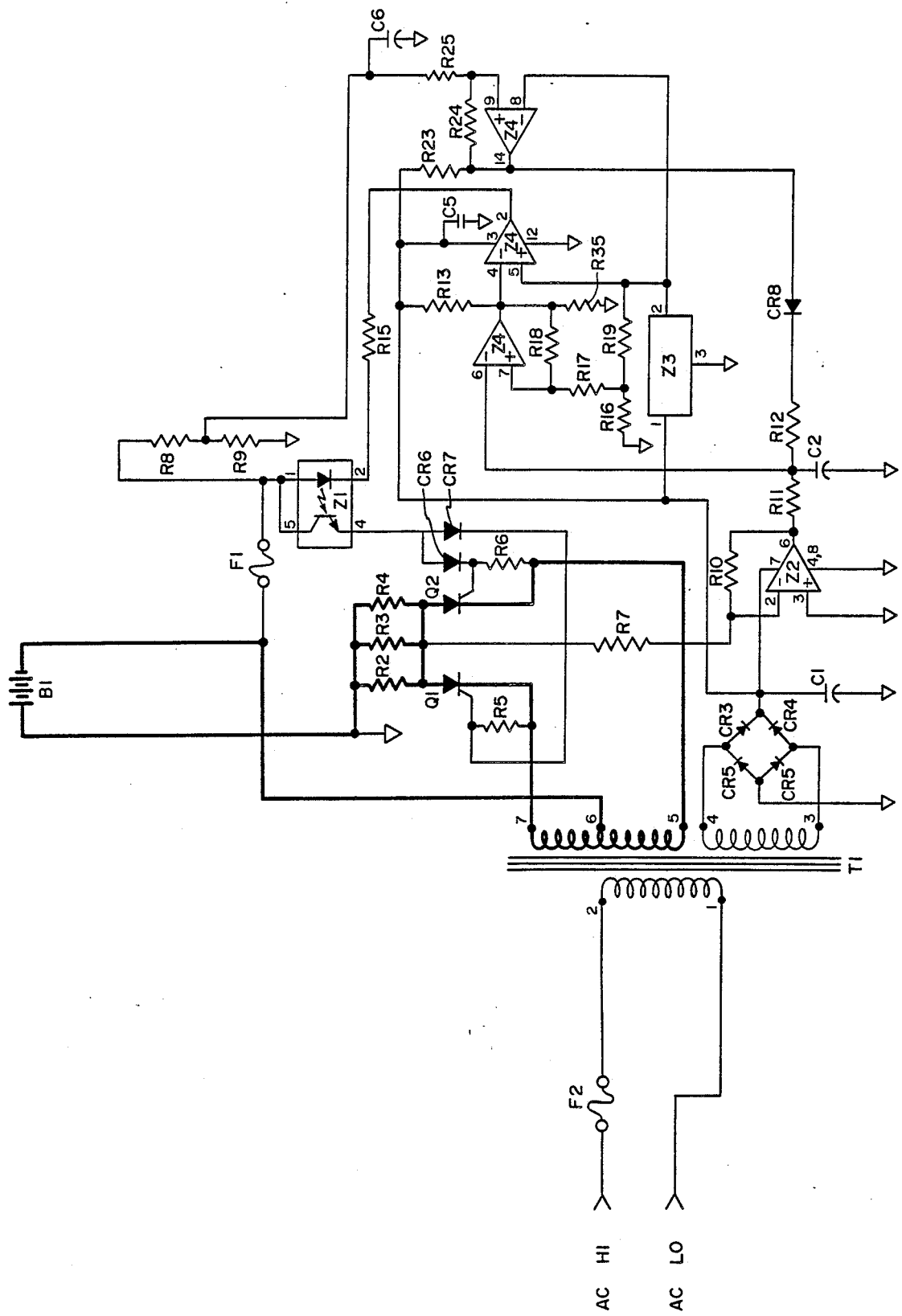
FIG. 3 a detailed schematic diagram showing the precise configuration of the components used in a presently preferred embodiment of the present invention.

It should be appreciated that many different components and arrangement of those components, could be devised to carry out the invention by those skilled in the art. Also, as illustrated in FIG. 3, additional components may be necessary to best implement the invention. The simplified schematic diagram illustrated in FIG. 2, however, is deemed best suited to providing an understanding of the structure and operation of the major components of the invention. As a matter of convention, in FIGS. 2 and 3, when two lines meet no connection is intended unless a dot is provided at their intersection. Further, for purposes of clarity, in FIG. 2 the current paths through circuit 200 that carry a "high" current of between two and twenty amperes are shown by bold lines.

In FIG. 2, all of the major functional blocks illustrated in FIG. 1 have also been included in the form of boxes in dashed lines which have been labeled with the same reference numerals as used in FIG. 1 for corresponding functional blocks. For example, the components carrying out the functions represented by block 102 labeled "AC Power" in FIG. 1 are contained within box 102 of FIG. 2.

The components performing the function of Switching Device 106 in FIG. 1, are included within box 106 of FIG. 2. These include silicon controlled rectifiers 220 and 224 (SCRs). The remaining components in block 106 are associated with SCRs 220 and 224 are necessary for SCRs 220 and 224 to operate properly. Bearing in mind that efficiency is an object of the present invention and that two SCRs perform more efficiently than one, the switching function may alternatively be carried out by a single discrete device.

The Battery 114 in FIG. 1 is represented by battery 234 contained within box 114 of FIG. 2. "Gel-cell" batteries are generally preferred as the rechargeable battery for use with the present invention, however, many other types of rechargeable batteries presently known, or devised in the future, may be used with the present invention.

Box 110 of FIG. 2 corresponds to Sensing Element 110 of FIG. 1 and includes a resistor 232. Resistor 232 is but one of the devices that can be used as the Sensing Element represented by Block 110 shown in FIG. 1. In the embodiment illustrated in FIG. 2, resistor 232 is connected between battery 234 and SCRs 220 and 224 and has been chosen to produce a voltage proportional to the current through battery 234 without substantially affecting that current flow. It will be appreciated, however, that other structures and methods could be used to measure the current through battery 234. For example, a sensing loop encircling a terminal of battery 234 would result in an induced voltage proportional to the current through battery 234 and might also be used for the same purpose.

The components performing the function of Current Sensing Loop 124 in FIG. 1, are contained within box 124 in FIG. 2. Likewise, the function of Voltage Sensing Loop 118 in FIG. 1 is performed by the box 118 in FIG. 2. Voltage Sensing Loop 118 will also be referred to herein as an overvoltage protection circuit.

The components within box 130 in FIG. 2 carry out the functions of DC Power 130 in FIG. 1. The purpose of components contained in box 130 is to provide DC power for the active components contained in the other functional blocks of circuit 200.

Having explained the overall arrangement of major functional blocks of the preferred embodiment, the individual components of each functional block will now be identified and described. It should be appreciated that the specific components described, and their particular values, are merely representative of the components and values which those skilled in the art will appreciate could be used to carry out the present invention.

Within box 102 is a transformer having a laminated iron core 210 and a primary winding 208 connected to an AC power source 202 by way of transformer primary terminals 204 and 206. Circuit 200 in FIG. 2 is intended to be powered by an AC power source 202 operating in an anticipated frequency range of between 50 and 60 Hz at a level of 120 volts rms. The circuitry disclosed, however, is capable of functioning satisfactorily at any line frequency in the range of 25 to 400 Hz. It will also be appreciated that AC power source 202 must be able to supply sufficient current for proper operation of circuit 200. This generally would not be deemed a problem, however, as circuit 200 is intended to require less than 20 amperes. A transformer secondary, generally indicated at 212, is provided with first and second terminals 214 and 218, respectively, as well as a center tap 216. Secondary 212 is configured to provide 8 volts between center tap 216 and each of secondary end terminals 214 and 218.

Center tap line 216 is connected to a first terminal 234A of battery 234. A second terminal 234B of battery 234 is connected to a first terminal 232A of resistor 232. As explained earlier, the purpose of resistor 232 is to create a voltage which is directly proportional to the current through battery 234. The resistance of resistor 232 is generally very low and may be 0.033 ohm. Thus, it is preferred that resistor 232 be capable of dissipating at least 0.2 watt of power in order to allow the average current of 2.5 amperes to flow through battery 234. Second terminal 234B of battery 234 and first terminal 232A of resistor 232 are connected to the circuit common 300.

A second terminal 232B of resistor 232 is connected to SCRs 220 and 224 at the anodes 220A and 220B thereof, respectively. SCRs 220 and 224 each include in addition cathodes 220B and 224B, respectively, and gates 220C and 224C, respectively. For convenience, the anode or cathode of a device, such as an SCR, will when appropriate be referred to hereafter using the term "current carrying terminal." This will distinguish such terminals from the gate or other control terminal of the device. SCRs 220 and 224 are identical and may be of the type generally designated in the art as S4060F.

It is important that SCRs 220 and 224 have sufficient current carrying capacity, an adequate peak inverse voltage rating, and the lowest possible forward biased resistance so that power dissipated by SCRs 220 and 224 will be minimized.

SCRs 220 and 224 are each provided with the associated components shown within box 106. Resistor 222 is necessary to properly bias SCR 220. Resistor 222 is connected between gate 220C and cathode 220B of SCR 220. Resistor 222 has a value of approximately 1 Kohms. Cathode 228B of diode 228 is connected to the gate 220C of SCR 220. Diode 228 is a silicon diode of the type generally known in the art as IN4148. Similarly, SCR 224 has associated with it resistor 226 and diode 230 which function in a similar fashion and preferably are identical to resistor 222 and diode 228, respectively. Cathode 220B of SCR 220 is connected to first transformer secondary end terminal 214. Cathode 224B of SCR 224 is connected to second transformer secondary end terminal 212. Thus, a closed current path is provided from center tap 216 through battery 234, resistor 232, and SCR 220 to first transformer secondary terminal 214. Similarly, a closed current path is provided from center tap 216 through battery 234, resistor 232, and SCR 224 to second transformer secondary terminal 214. Thus, a current loop is provided through battery 234 which may be readily controlled by SCRs 220 and 224.

The current through a battery during the recharge procedure is generally referred to as the "charge current." A charge current may be either direct current or pulsed direct current, since it is principally the total number of electrons flowing through the battery that is of concern during charging, regardless of whether the instantaneous current is constant. Nevertheless, it is very desirable that the average charge current be maintained constant so that the charging status may be more reliably predicted.

If a charge current is too high, it may lead to excessive heat within the battery, thus causing destruction or damage to the battery or other nearby components. Alternatively, a charge current which is too low will not charge the battery within the desired time period. In the embodiment illustrated in FIG. 2, it is contemplated that a 6-volt "gel-cell" battery rated at 10 amp hours, such as battery model LCR-1006P manufactured by Panasonic will be used.

The circuit 200 illustrated in FIG. 2 is configured so that the average charge current will be maintained at approximately 2.3 amperes. Using a 6 volt, 10 amp hour battery, a charge current of 2.3 amperes will fully charge the battery within four hours without generating excessive heat. The normal terminal voltage of such a battery when it is fully charged is approximately 6.9 volts.

The components enclosed within box 124 in FIG. 2 perform the function of Current Control Loop 124 in FIG. 1. These components control SCRs 220 and 224 by applying a proper voltage and current at the anodes 228A and 230A of diodes 228 and 230, respectively. Diodes 228 and 230 are connected to gates 220C and 224C of SCRs 220 and 224, respectively, so that SCRs 220 and 224 will be "gated on" for the proper period of time to maintain a constant or otherwise desired charge current through battery 234. The period of time when SCRs 220 and 224 are gated on will be referred to as their "duty cycle."

In accordance with one aspect of the present invention, sensing means are provided for producing a sensed voltage proportional to the current through a load, such as battery 234. By way of example, resistor 232 is placed in the charge current path to produce a sensed voltage which is directly proportional to the instantaneous charge current.

In accordance with the present invention, there is also provided integration means for integrating the sensed voltage produced by a sensing element, such as resistor 232, and for producing therefrom an integrated signal representing the average current flow through a load, such as battery 234. As shown in FIG. 2 by way of example and not limitation, the second terminal 234B of resistor 232 is connected through a resistor 236 to the inverting input 240 of amplifier 244. Amplifier 244 may be one of many commercially available operational amplifiers, which are fabricated as integrated circuits. It is preferred that amplifier 244 be of the type generally designated in the art as TLC271; however, other types of amplifiers, including those using discrete components, could also be used.

A resistor 238 is connected between inverting input 240 and output 246 of amplifier 244. Noninverting input 242 of amplifier 244 is tied to circuit common 300, thus causing amplifier 244 to operate as an inverting amplifier. Resistor 236 preferably has a value of 10 Kohms, while resistor 238 preferably has a value of 27 Kohms. Amplifier 244 thus has a gain of approximately 2.7.

Included in the invention is an averaging means for averaging a sensed voltage, such as appears across resistor 232, and has been processed by an input amplifier, such as amplifier 244, to produce an averaged sensed voltage. As illustrated in the embodiment of the present invention shown in FIG. 2, output 246 of amplifier 244 is connected to one side of a resistor 248, which preferably has a value of about 100 Kohms. A capacitor 250 preferably having a value of approximately 2.2 microfarads and rated at at least 20 volts is connected between the other side of resistor 248 and circuit common 300 at a junction 252.

The function of capacitor 250 and resistor 248 is to integrate or average the output of amplifier 244. Thus, pulses which are applied to input 240 of amplifier 244 are amplified and then integrated by the RC circuit formed by resistor 248 and capacitor 250 connected to output 246 of amplifier 244. The values for capacitor 250 and resistor 248 are chosen so that the RC circuit has a time constant that produces a DC voltage output at junction 252 that is proportional to the average charge current.

In accordance with yet another aspect of the present invention, there is also provided comparison means for comparing the integrated signal representing the average current flow through a load, such as battery 234, and producing a corresponding control signal. By way of example, as shown in FIG. 2, the DC voltage at junction 252 is supplied to a first comparator 254 at the inverting input 256 thereof. First comparator 254, as well as second comparator 264 and third comparator 288, which will be described shortly, may be of the type commonly designated in the art as TLC 374. Nevertheless many different types of comparators, or even other types of components, may perform the same function and fulfill the purpose of the components specified.

A reference voltage generator represented by block 274 is utilized in relation to first, second, and third comparators 254, 264 and 288, respectively. It will be appreciated that many different devices are available in the art which generate an accurate reference voltage. The reference voltage generator 274 may preferably be a device generally designated in the art as MC 1403.

Resistors 270 and 272 connected in series between reference voltage generator 274 and circuit common 300 form a voltage divider which "divides down" the reference voltage provided by reference voltage generator 274. The "divided down" reference voltage appearing across resistor 272 is applied to noninverting input 258 of first comparator 254. Thus, the signal at output 260 of first comparator 254 will change states when the voltage applied to inverting input 256 thereof ceases to be equal to the "divided down" reference voltage applied to noninverting input 258. In this way, the signal at output 260 of first comparator 254 can be made to reflect whether the charge current through battery 234, as represented by the DC voltage at junction 252, is at the proper level.

The signal at output 260 of first comparator 254 is conducted to inverting input 266 of second comparator 264. The noninverting input 268 of second comparator 264 is tied to the undivided output voltage of voltage reference generator 274. Thus, second comparator 264 merely inverts the signal applied to it at its inverting input 266.

In another aspect of the circuit of the present invention, means are provided for isolating the output of a comparator, such as second comparator 264, from a switching device, such as that included in block 106, which is to be controlled by the output of the comparator. As shown in circuit 200 of FIG. 2, by way of example, the signal at output 262 of second comparator 264 is connected to an opto-isolator 278 through a resistor 276, which may have a value of 330 ohms. Opto-isolator 278 may be of the type generally s 2 designated in the art as 4N37. The internal components of opto-isolator 278 consist of a light emitting diode 280 (LED), having a cathode 280B connected to resistor 276 and an anode 280A connected to transformer secondary center tap 216.

Opto-isolator 278 also includes a phototransistor generally designated 282. Collector 282A of phototransistor 282 also connected to transformer secondary center tap 216, while phototransistor base 282C is optically coupled to LED 280. The output of opto-isolator 278 appearing at the emitter 282B of phototransistor 282 is connected to anodes 228A and 230A of diodes 228 and 230, respectively, in box 106. By the above-described arrangement, it can be clearly seen that a current control loop is formed from the components shown in box 124 and described above.

As mentioned earlier, it is undesirable to overcharge a battery. One indication that a battery is being overcharged is a high terminal voltage. For example, as mentioned earlier, a battery designed for use with the embodiment illustrated in FIG. 2 may have achieved its maximum charge once its terminal voltage has reached 6.9 volts. Thus, by monitoring the terminal voltage of battery 234, overcharging can be avoided.

Accordingly, in yet another aspect of the present invention, overvoltage protection means are provided for preventing a current control loop, such as that represented by the elements shown in box 124 of FIG. 2, from increasing the duty cycle of a switching device, such as that shown within box 106 of FIG. 2, if the voltage across the terminals of a recharging battery is greater than or equal to a predetermined threshold voltage value. Such a function is carried out by the components contained within box 118, which will collectively and alternatively be referred to as an overvoltage protection circuit.

One aspect of the overvoltage protection means include a means for comparing the voltage across the terminals of a battery to some reference voltage, thereby to detect when the voltage across such battery terminals exceeds a predetermined threshold voltage level. As shown in FIG. 2, resistors 284 and 286 in combination with third comparator 288 exemplify one manner in which this function can be performed. Resistors 284 and 286 are series connected such that one side of resistor 284 is connected to transformer secondary center tap 216 and first terminal 234A of battery 234 and the other side is connected to one side of resistor 286. The other side of resistor 284 is connected to circuit common 300. Thus, resistors 284 and 286 form a voltage divider that is connected in parallel with battery 234.

In the embodiment illustrated in FIG. 2, resistors 284 and 286 have a value of 10 Kohms and 1 Mohms, respectively. A divided battery terminal voltage appears across resistor 284 and is applied to noninverting input 290 of third comparator 288. Inverting input 292 of third comparator 288 receives the undivided reference voltage from reference voltage generator 274. When the values of resistors 284 and 286 have properly selected, the signal at output 294 of third comparator 288 will become positive when the terminal voltage of battery 234 as divided by resistors 284 and 286 and applied to noninverting input 290 of third comparator 288 exceeds a predetermined threshold voltage corresponding to the voltage produced by reference voltage generator 274 as applied to inverting input 292 of third comparator 288.

In another aspect of the overvoltage protection means, means are provided for reducing the charge current through a battery, such as battery 234, when the voltage across the battery terminals reaches a predetermined threshold voltage. In the embodiment of the invention illustrated in FIG. 2, this involves interrupting the control of the charge current normally exercised by a current control loop, such as that exemplified by the devices contained within block 124 of FIG. 2. Thus, a positive signal at output 294 of third comparator 288 is conducted through a diode 296 and a resistor 298 to junction 252 in box 124. Diode 296 may be identical to any of the diodes described earlier, and resistor 298 may have a value of 470 Kohms.

With the voltage output of third comparator 288 thus applied to junction 252, when the terminal voltage of battery 234 exceeds a preselected threshold voltage, overvoltage protection circuit 118 will cause the voltage at point 252 to increase. This interrupts the normal operation of the current control loop within box 124, causing the duty cycle of SCRs 220 and 224 to be reduced, or even causing SCRs 220 and 224 to be gated off. Battery 234 is thus protected from being overcharged.

The components contained within box 130 function as a DC power source, for the active components of circuit 200. In the illustrated embodiment of FIG. 2, an auxiliary transformer secondary winding 302 on laminated core 210 has two terminals 304 and 306 which are connected to a bridge rectifier 308. The positive DC output of bridge rectifier 308 is filtered with a capacitor 310 and then is distributed to the various active components of circuit 200, as indicated by arrow 312. It will be appreciated that many different circuit configurations would serve the function performed by the components within box 130.

Having an understanding of the general configuration of the structure of the presently preferred embodiment, the operation of embodiment will now be explained next.

3. Operation of the Presently Preferred Embodiment

As explained earlier, alternating current is applied to the primary winding 208 of the transformer. A closed s current path is formed by transformer secondary center tap 216, battery 234, resistor 232, SCRs 220 and 224, and first transformer secondary 212. By the use of a center tapped transformer and two SCRs, full wave rectification of the AC waveform is effected.

It will be appreciated that in the embodiment illustrated in FIG. 2, current flow through battery 234 will occur only when SCRs 220 and 224 are gated on. Thus, since full wave rectification occurs, either SCR 220 or SCR 24 will conduct on alternate half cycles of the AC waveform. The use of SCRs 220 and 224 as both rectifiers and switching devices provides for considerable savings in components, increased efficiency, and decreased heat generation.

In operation, the charge current flows through resistor 232 generating a sensed voltage at the junction of resistor 232 and SCRs 220 and 224. The sensed voltage is a series of negative pulses having a sinusoidal shape, or a partial sinusoidal shape when SCRs 220 and 224 are gated "on" at midcycle. The negative voltage pulses are amplified and inverted by amplifier 224.

The output of amplifier 224 is integrated, or averaged, by the RC circuit formed by resistor 248 and capacitor 250. The DC voltage present at junction 252 is directly proportional to the average sensed current through sensing resistor 232 and battery 234. The average voltage present at junction 252 is compared by first comparator 254 against a divided reference voltage, provided by reference voltage generator 274 and the voltage divider formed by resistors 270 and 272. The output of first comparator 254 is inverted by second comparator 264, and the output of second comparator 264 is used to drive opto-isolator 278. The output of opto-isolator 278 sources the gate current for SCRs 220 and 224, thus completing a current control loop which controls the average charge current at a constant level.

As battery 232 is charged, the battery terminal voltage rises. The battery terminal voltage is continuously monitored by a third comparator 288 through a resistive divider circuit formed by resistors 284 and 286. The values of resistors 284 and 286 are chosen such that when the battery terminal voltage reaches its full charge level, the voltage present at the divider will equal the reference voltage supplied by reference voltage generator 274, causing the output signal of third comparator 288 to change to a positive state.

Once this occurs, comparator 288 will source current through diode 296 and resistor 298 to junction 252. The voltage at junction 252 will rise, the current control loop within box 124 will be interrupted, and the SCRs 220 and 224 will tend to be gated off, reducing their duty cycle. This condition will continue until the voltage across the terminals of battery 234 returns below that level which causes third comparator 288 to go positive. At that time the output of comparator 288 will become negative and the current control loop within box 124 will resume normal operation.

4. Description of the Detailed Schematic of the Preferred Embodiment

As explained earlier, the embodiment of the circuit 200 shown in FIG. 2 has been simplified in order to increase the clarity of the disclosure and to facilitate an understanding of its operation. Therefore, some components and interconnections have not been shown. FIG. 3 presents a detailed schematic diagram of a presently preferred embodiment of circuit 200 illustrated in FIG. 2. As in FIG. 2, the charge current paths in FIG. 3 have been indicated by bold lines. The "pin outs" of the components have been shown in FIG. 3 where appropriate.

Provided below is a table listing the values of the components referenced in the detailed schematic of FIG. 3.

| Component Designation | Description |
| --- | --- |
| Z1 | Opto-Isolator 4N37 |
| Z2 | Operational Amplifier TLC271 |
| Z3 | Voltage Reference MC1403 |
| Z4 | Quad Comparator TLC374 |
| Q1-Q2 | SCR S4060F |
| CR2-CR5 | Diode 1N4001 |
| CR6-CR8 | Diode 1N4148 |
| R2-R4 | Resistor .1 ohm 2 watts |
| R5-R6 | Resistor 1 Kilohm ¼ watt 5% |
| R7 | Resistor 10 Kilohm ¼ watt 5% |
| R8 | Resistor 15 Kilohm RN55C |
| R9 | Resistor 8.06 Kilohm RN55C |
| R10 | Resistor 27 Kilohm ¼ watt 5% |
| R11 | Resistor 100 Kilohm ¼ watt 5% |
| R12 | Resistor 47.0 Kilohm ¼ watt 5% |
| R13 | Resistor 10 Kilohm ¼ watt 5% |
| R15 | Resistor 330 Ohm ¼ watt 5% |
| R16 | Resistor 220 ohm ¼ watt 5% |
| R17 | Resistor 5.1 Kilohm ¼ watt 5% |
| R18 | Resistor 1 megohm ¼ watt 5% |
| R19 | Resistor 2.4 Kilohm ¼ watt 5% |
| R23 | Resistor 10 Kilohm ¼ watt 5% |
| R24 | Resistor 1 megohm ¼ watt 5% |
| R25 | Resistor 10 Kilohm ¼ watt 5% |
| R35 | Resistor 10 Kilohm ¼ watt 5% |
| C1 | Capacitor 68 microfarad 20 volt |
| C2 | Capacitor 2.2 microfarad 20 volt |
| C5 | Capacitor 0.1 microfarad 50 volts |
| C6 | 2.2 microfarad 20 volts |
| T1 | Transformer 120 volt primary |

-continued

| Component Designation | Description |
| --- | --- |
| B1 | 16 volt center tapped 8 volt secondary "Gel-Cell" battery 6 volt, 10 amp hours |
| F1 | Fuse 3 amp slow-blow type |
| F2 | Fuse .5 amp slow-blow type |

SUMMARY

As will be appreciated from the foregoing description, the present invention provides an efficient regulated battery charger which maintains high efficiency even over a wide range of voltages. Still further, due to the small number of components necessary to implement the present invention, embodiments of the present invention may be housed in a physically small space. Because of the relatively high efficiency of the present invention, little heat is generated, thus facilitating the enclosure of embodiments incorporating the present invention in compact housings with little or no ventilation.

All of the above listed advantages are gained while still avoiding the problem of producing radio frequency interference common in other type of high efficiency switching-type regulators. The present invention is also provided with means for monitoring the terminal voltage of a rechargeable battery and preventing its overcharging. Importantly, the present invention maintains a constant average charge current through the battery, thus allowing the recharging process to be predictably carried on.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A circuit for regulating the average current through and the voltage applied across the first and second terminals of a load, the circuit comprising:
   a transformer secondary having two end terminals and a center tap, the center tap being connected to the first terminal of the load;
   a pair of individually and selectively operable switching elements, each of said switching elements being connected between the second terminal of the load and a respective one of the end terminals of the transformer secondary, each of said switching elements during the duty cycle thereof completing a closed current path in which current flows through the load in a single common current flow direction;
   a sense element comprising a resistance of less than 1 ohm connected in series with the load for producing a sensed voltage proportional to the current through the load;
   a current control loop connected to the sense element and the switching device, the current control loop adapted for controlling the duty cycle of the switching elements to maintain a constant average current through the load;

means for establishing a preselected threshold voltage; and a voltage control loop having a comparator circuit for comparing the voltage present at the terminals of the load and a preselected threshold voltage for flexibly decreasing the duty cycle of the switching elements controlled by the current control loop, to maintain charging current above a trickle charge in proportion to the amount by which said load voltage exceeds said threshold voltage, and maintaining said load voltage at or below said preselected threshold voltage.

2. A circuit as defined in claim 1 wherein the load comprises a battery.

3. A circuit as defined in claim 1 wherein the switching elements comprise semiconductor switching devices.

4. A circuit as defined in claim 3 wherein the semiconductor switching elements comprise silicon controlled rectifiers.

5. A circuit as defined in claim 4 wherein the current control loop comprises:
integration means for integrating the sensed voltage produced by the sensing element and for producing therefrom an integrated signal representing the average current flow through the load; and
comparison means for comparing the integrated signal to a reference voltage and producing a corresponding control signal.

6. A circuit as defined in claim 5 wherein the integration means comprises an amplifier configured as an integrator.

7. A circuit as defined in claim 6 wherein the amplifier has a gain greater than one.

8. A circuit as defined in claim 6 wherein the integration means further comprises an RC circuit connected to the output of the amplifier.

9. A circuit as defined in claim 5 wherein the comparison means comprises a comparator and a reference voltage generator.

10. A circuit as defined in claim 5 wherein the comparison means comprises a first and a second inverting comparator, the output of the first comparator being connected to the inverting input of the second comparator.

11. A circuit as defined in claim 10 the current control loop further comprises isolation means for isolating the output of the second comparator from the switching device.

12. A circuit as defined in claim 11 wherein the isolation means comprises an opto-isolator.

13. A battery charging circuit comprising:
an alternating current power source comprising a secondary winding of a transformer, the secondary winding having first and second end terminals and a center tap, the center tap being connected to a first terminal of the battery;
a switching device connected in series with the battery for permitting current flow in a single direction therethrough, the switching device comprising first and second semiconductor switching elements each having a first and a second current carrying terminal, the first current carrying terminal of each semiconductor switching element being connected to a second terminal of the battery, the second current carrying terminal of the first semiconductor switching element being connected to the first end terminal of the secondary winding, and the second current carrying terminal of the second semiconductor switching being connected to the second end terminal of the secondary winding;

sensing means connected in series with the battery and the switching device for producing a sensed voltage proportional to the current through the battery;

averaging means for averaging the sensed voltage to produce an averaged sensed voltage;

comparison means comprising an opto-isolator connected between the comparator and the switching device, the opto-isolator responding to the control signal to control the duty cycle of the switching device for comparing the averaged sensed voltage to a reference voltage and for controlling the duty cycle of the switching elements to maintain a preselected constant charge current through the battery if the averaged sensed voltage deviates from a value corresponding to the preselected current; and overvoltage protection means comprising a voltage comparator circuit having at least one input and an output, the voltage across the battery terminals being applied to one input of the voltage comparator circuit and the output of the voltage comparator being connected to the comparison means to flexibly decrease the duty cycle of the switching elements controlled by the comparison means to flexibly decrease the charging current when battery voltage equals or exceeds said predetermined threshold voltage, in proportion to said voltage excess.

14. A circuit as defined in claim 13 wherein the switching elements comprise silicone controlled rectifiers.

15. A circuit as defined in claim 13 wherein the sensing means comprises a resistive element connected in series between the battery and the switching device.

16. A circuit as defined in claim 13 wherein the averaging means comprises an amplifier.

17. A circuit as defined in claim 16 wherein the averaging means further comprises an RC circuit connected to the output of the amplifier.

18. A circuit as defined in claim 13 wherein the comparison means comprises a comparator configured to compare the averaged sensed voltage to a first reference voltage and to produce a corresponding control signal.

19. A circuit for maintaining a constant average charge current through a rechargeable battery and for preventing overcharging of the battery, the circuit comprising:
(a) a switching device connected in series with the battery for permitting current flow in a single direction therethrough, the switching device comprising first and second semiconductor switching elements each having first and second current carrying terminals, the semiconductor switching elements being connected parallel one to another at one terminal of the battery by said first current carrying terminals;
(b) a sensing element adapted for producing a sensed voltage proportional to the charge current;
(c) a current control loop comprising:
(i) averaging means comprising an amplifier, and further comprising an RC circuit connected to the output of said amplifier for averaging the sensed voltage to produce at an output thereof an average sensed voltage;

(ii) comparison means for comparing the average sensed voltage to a reference voltage to produce a corresponding control signal;

(iii) isolation means comprising an opto-isolator, the output of the opto-isolator being connected to the switching device and being responsive to the control signal for controlling the switching device to maintain through the battery a constant charge current; and (d) an overvoltage protection loop comprising:

(i) means for comparing the voltage across the battery terminals to a reference voltage; and (ii) means for flexibly reducing the charge current to a level equal to or greater than a trickle charge when the voltage across the battery terminals reaches a predetermined threshold voltage, and maintaining said battery terminal voltage at a level equal to or below said predetermined threshold voltage.

20. A circuit as defined in claim 19 wherein the first and second semiconductor switching elements comprise silicon controlled rectifiers.

21. A circuit as defined in claim 19 further comprising a transformer secondary winding having first and second end terminals and a center tap, the center tap being connected to one terminal of the battery, the first end terminal of the transformer secondary being connected to the first end terminal of the first switching element and the second end terminal of the transformer secondary being connected to the first end terminal of the second switching element.

22. A circuit as defined in claim 19 wherein the means for reducing the charge current is connected to the output of the averaging means.

23. A circuit for charging a battery from an AC power line, the battery having first and second terminals and the circuit comprising:

a transformer having a secondary winding provided with first and second end terminals and a center tap, the center tap being connected to the first terminal of the battery;

a resistive element having first and second terminals, the first terminal of the relative element being connected to the second terminal of the battery;

two semiconductor switching devices for permitting current flow in a single direction through the battery, each of the semiconductor switching devices having first and second current carrying terminals and a control terminal, the first current carrying terminal of each of the switching devices being connected to the second terminal of the resistive element, the second current carrying terminal of the first semiconductor switching device being connected to the first end terminal of the secondary winding, and the second current carrying terminal of the second semiconductor switching device being connected to the second end terminal of the secondary winding;

averaging means for averaging the voltage across the resistive element to produce as an output an averaged sensed voltage;

means for producing a reference voltage;

comparison means comprising an opto-isolator connected between the comparator and the switching device, the opto-isolator responding to the control signal to control the duty cycle of the switching device for comparing the averaged sensed voltage to the reference voltage and for producing a corresponding control signal, the control signal being applied to the control terminals of the semiconductor switching devices to control the duty cycle of the semiconductor switching devices and maintain the current through the battery at a constant level; and overvoltage protection means comprising a voltage comparator circuit having at least one input and an output, the voltage across the battery terminals being applied to one input of the voltage comparator circuit and the output of the voltage comparator being connected to the comparison means to monitor the voltage across the terminals of the battery and to maintain the voltage across the terminals of the battery at a level equal to or less than a predetermined threshold voltage by modifying comparison means control of the duty cycle of the semiconductor switching devices to flexibly reduce the duty cycles thereof, according to the relationship between said battery voltage equal and said threshold voltage.

* * * * *